Aug. 4, 1931.　　　N. J. POUX　　　1,817,838
SEPARABLE FASTENER
Filed Sept. 16, 1929　　2 Sheets-Sheet 1
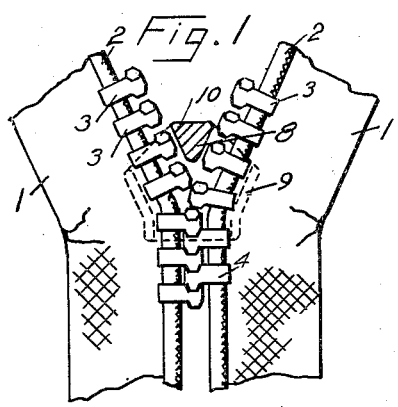
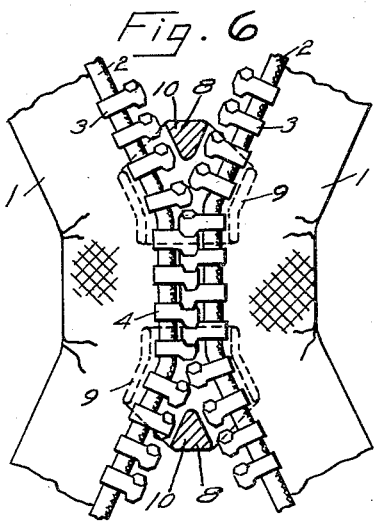
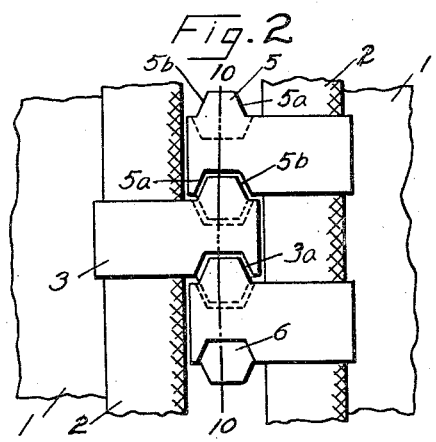
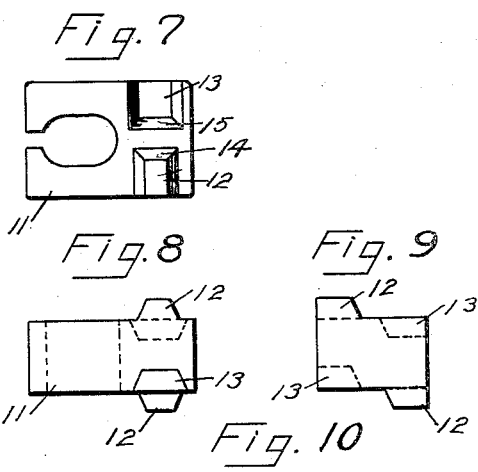
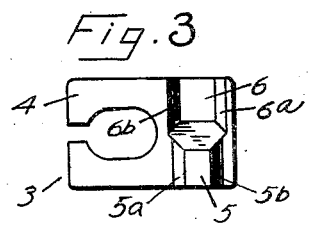
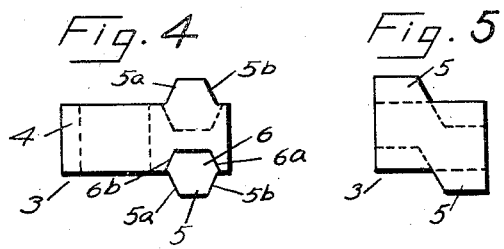
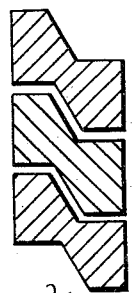

Aug. 4, 1931.     N. J. POUX     1,817,838
SEPARABLE FASTENER
Filed Sept. 16, 1929     2 Sheets-Sheet 2
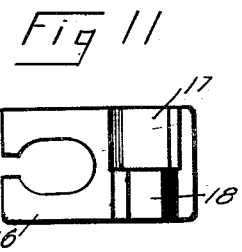
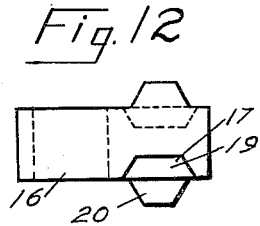
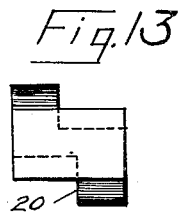
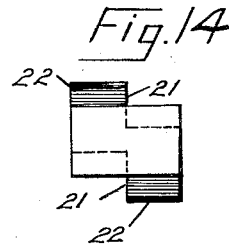
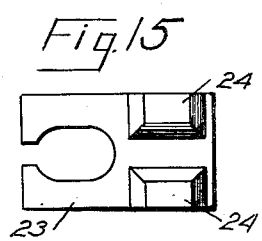
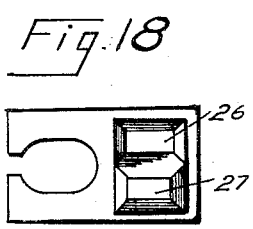
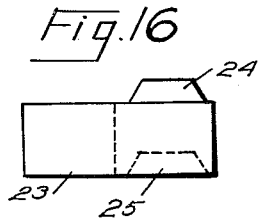
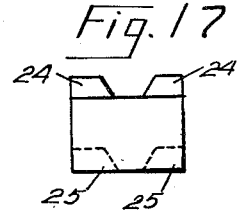
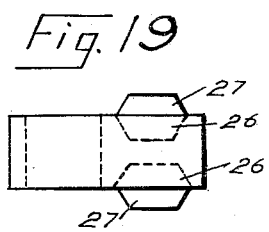
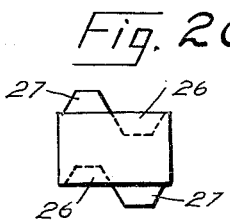
Noel J. Poux
INVENTOR
BY
ATTORNEY Patented Aug. 4, 1931

1,817,838

UNITED STATES PATENT OFFICE

NOEL J. POUX, OF MEADVILLE, PENNSYLVANIA, ASSIGNOR TO LION FASTENER INC., OF MEADVILLE, PENNSYLVANIA, A CORPORATION OF DELAWARE

SEPARABLE FASTENER

Application filed September 16, 1929. Serial No. 392,784.

The object of the present invention is to simplify the structure of separable fasteners to improve the flexibility thereof, to improve the engagement of the units of the fastener, and form a fastener in which the slider may be operated from either end, and a fastener in which the interlocking parts may be symmetrically formed as to opposing sides and edges. Features and details of the invention will appear from the specification and claim.

A preferred embodiment of the invention is illustrated in the accompanying drawings as follows:—

Fig. 1 shows a front elevation of a fastener assembly, the slider being in section to better show construction.

Fig. 2 an enlarged view of the assembly.

Fig. 3 an elevation of one of the locking members.

Fig. 4 a plan view of the same.

Fig. 5 an end view of the same.

Fig. 6 a side elevation of the assembly shown in Fig. 1 with sliders at both ends.

Fig. 7 a side elevation of a modified member.

Fig. 8 an edge view of the same.

Fig. 9 an end view of the member shown in Figs. 7 and 8.

Fig. 10 a section on the line 10—10 in Fig. 2.

Fig. 11 an elevation of a member showing a further modification.

Fig. 12 an edge view of the same.

Fig. 13 an end view of the structure shown in Figs. 11 and 12.

Fig. 14 an end view of a slight modification of the structure shown in Fig. 13.

Fig. 15 a side elevation of a member illustrating a further modification.

Fig. 16 a detail view of the same modification.

Fig. 17 an end view of the same modification.

Fig. 18 an elevation of a member showing a further modification.

Fig. 19 an edge view of the same.

Fig. 20 an end view.

1 marks the stringers. These may be of ordinary form and provided with marginal ribs 2 along their opposing edges. The locking members 3 are provided with jaws 4 by which the members are secured on the ribs 2 in the usual manner. The members have projections 5 on each side, or longitudinal face. These projections are preferably of semi-hexagonal form and are on different planes, one being at, or adjacent to one edge of the member and the projection on the opposite side being at the opposite edge of the member. These projections have rearwardly faced engaging surfaces 5a and the outward faces 5b.

Each of the members is also provided with cavities 6. These are preferably of hexagonal form and extend through the edges of the members. These cavities on the opposite faces of the members are in different planes and oppose the projections on the adjacent members. The cavities have the rearwardly faced engaging surfaces 6a and the outwardly faced surfaces 6b. While the cavities and projections are of similar shape the surfaces are so disposed relatively to each other to provide a slight spacing 3a between opposing engaging surfaces of the members. This assures clearance to permit of the easy closing and separation of the members while permitting of ample interlocking surfaces to maintain the closure of the fastener in use.

The slider 8 is of ordinary form having guiding ribs 9 and the arrow-head center 10, this slider guiding the opposing edges of the stringers with the members with a sharp bend, as clearly shown in Fig. 1 to guide the members and permit the projections to successively rock into and out of the cavities of the adjacent members.

The shape and position of these projections facilitate the easy swinging of the projections into place in the cavities. There are two rearwardly faced engaging surfaces on each side of each member. Thus the rearwardly faced surface 5a tends to lock its engaged member against lateral separation and on the same side there is the rearwardly faced engaging surface 6a engaging the opposing member and operating to prevent lateral separation. Not only this, but each member is locked against in and out movement out of the plane of the stringers. This is brought about by the fact that the projection at one side of a member extends over and the projection at the opposite side of said member extends under the adjacent engaged member. Further, it will be noted that the members have their engaging portions symmetrically placed at opposite sides of each member and not only symmetrically placed but of exactly similar contour so that the members may be placed either side up and the slider will operate from either end with equal facility in that the engaging faces are exactly the same in both directions. The opposing members are rights and lefts, as shown, but are otherwise the same.

In the modification shown in Figs. 7, 8 and 9, the members have the jaws 11, the projections 12 and sockets 13. These differ from the structures shown in Figs. 1 and 2 in that the surface 14 of the projection is not a continuation of the surface 15 of the recess—in other words, the bases of the projection and recess are slightly spaced apart. Otherwise the structure is similar to that shown in Figs. 1 and 2.

In the modification shown in Figs. 11, 12 and 13, the members are provided with the jaws 16, cavities 17, and projections 18. In these the surfaces 19 and 20 of the projections are in planes vertical to the face of the member.

In Fig. 14 the structure is similar except that the surfaces 21 of the projections 22 are in the same plane as the surfaces of the recesses corresponding to the surfaces 19 in Fig. 12.

In the modification shown in Figs. 15, 16 and 17, the members have the jaws 23 and two projections 24 on one face and two recesses 25 on the opposite face. This accomplishes a complete edgewise locking, but reduces somewhat the possible edgewise dimension of the projections and recesses.

In Figs. 18, 19 and 20 the members have the usual jaws with recesses 26 and projections 27. These recesses and projections are similar in shape and arrangement to those shown in Fig. 1 except that the recesses do not extend out to the edge of the member.

What I claim as new is:—

A separable fastener comprising opposing series of interlocking members adapted to swing successively into locking position, a side of each member having a semi-hexagonally-shaped cavity and a projection semi-hexagonally shaped in section, the cavity opening through the edge of the member and the cavity receiving a projection and the projection extending into a cavity of an opposing member.

In testimony whereof I have hereunto set my hand.

NOEL J. POUX.